(12) United States Patent
Hofmann et al.

(10) Patent No.: US 6,624,286 B2
(45) Date of Patent: Sep. 23, 2003

(54) DOUBLE-METAL CYANIDE CATALYSTS CONTAINING POLYESTER FOR PREPARING POLYETHER POLYOLS

(75) Inventors: Jörg Hofmann, Krefeld (DE); Pramod Gupta, Bedburg (DE); Robert-Joseph Kumpf, Düsseldorf (DE); Pieter Ooms, Krefeld (DE); Walter Schäfer, Leichlingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/006,065

(22) Filed: Dec. 5, 2001

(65) Prior Publication Data

US 2002/0068812 A1 Jun. 6, 2002

Related U.S. Application Data

(63) Continuation of application No. 09/529,040, filed as application No. PCT/EP98/06229 on Oct. 1, 1998, now abandoned.

(30) Foreign Application Priority Data

Oct. 13, 1997 (DE) .......................... 197 45 120

(51) Int. Cl.[7] .............................. C08G 65/04
(52) U.S. Cl. .................. 528/415; 502/154; 502/156; 502/175; 502/159; 560/1; 568/700; 528/403; 528/405; 528/412; 528/414
(58) Field of Search ............... 502/154, 156, 502/175, 159; 560/1; 568/700; 528/403, 405, 412, 414, 415

(56) References Cited

U.S. PATENT DOCUMENTS

| | | | |
|---|---|---|---|
| 3,404,109 A | 10/1968 | Milgrom | 260/611 |
| 3,829,505 A | 8/1974 | Herold | 260/611 B |
| 3,941,849 A | 3/1976 | Herold | 260/607 A |
| 5,158,922 A | 10/1992 | Hinney et al. | 502/175 |
| 5,470,813 A | 11/1995 | Le-Khac | 502/175 |
| 5,482,908 A | 1/1996 | Le-Khac | 502/156 |
| 5,545,601 A | 8/1996 | Le-Khac | 502/156 |
| 5,627,120 A | 5/1997 | Le-Khac | 502/156 |
| 5,627,122 A | 5/1997 | Le-Khac et al. | 502/175 |
| 5,637,673 A | 6/1997 | Le-Khac | 528/405 |
| 5,639,705 A | 6/1997 | Bowman et al. | 502/175 |
| 5,712,216 A | 1/1998 | Le-Khac et al. | 502/175 |
| 5,714,428 A | 2/1998 | Le-Khac et al. | 502/159 |

FOREIGN PATENT DOCUMENTS

| | | |
|---|---|---|
| EP | 0 700 949 | 3/1996 |
| JP | 4-145123 | 5/1992 |
| WO | 98/16310 | 4/1998 |

*Primary Examiner*—Robert Dawson
*Assistant Examiner*—Kuo-Liang Peng
(74) *Attorney, Agent, or Firm*—Joseph C. Gil; John E. Mrozinski, Jr.

(57) ABSTRACT

The invention relates to new improved double-metal cyanide (DMC) catalysts for the preparation of polyether-polyols by polyaddition of alkylene oxides on to starter compounds containing active hydrogen atoms, the catalyst comprising a double-metal cyanide compound, an organic complexing ligand and 5–80 wt. %, based on the amount of catalyst, of a polyester.

For the preparation of polyether-polyols, the new improved catalysts have significantly shortened induction times and at the same time a greatly increased activity.

8 Claims, 2 Drawing Sheets

DOUBLE-METAL CYANIDE CATALYSTS CONTAINING POLYESTER FOR PREPARING POLYETHER POLYOLS

This application is a continuation of Application Ser. No. 09/529,040, filed on Apr. 5, 2000, now abandoned, which is the National Stage of PCT/EP98/06229, filed Oct. 1, 1998.

TECHNICAL FIELD OF THE INVENTION

The invention relates to new improved double-metal cyanide (DMC) catalysts for the preparation of polyether-polyols by polyaddition of alkylene oxides on to starter compounds containing active hydrogen atoms.

BACKGROUND OF THE INVENTION

Double-metal cyanide (DMC) catalysts for polyaddition of alkylene oxides on to starter compounds containing active hydrogen atoms are known (see, for example, U.S. Pat. Nos. 3,404,109, 3,829,505, 3,941,849 and 5,158,922). The use of these DMC catalysts for the preparation of polyether-polyols has the effect, in particular, of a reduction in the proportion of monofunctional polyethers with terminal double bonds, so-called monools, compared with the conventional preparation of polyether-polyols by means of alkali catalysts, such as alkali metal hydroxides. The polyether-polyols thus obtained can be processed to high-grade polyurethanes (e.g. elastomers, foams, coatings). DMC catalysts are usually obtained by reacting an aqueous solution of a metal salt with an aqueous solution of a metal cyanide salt in the presence of a low molecular weight organic complexing ligand, e.g. an ether. In a typical catalyst preparation, for example, aqueous solutions of zinc chloride (in excess) and potassium hexacyanocobaltate are mixed, and dimethoxyethane (glyme) is then added to the suspension formed. After filtration and washing of the catalyst with aqueous glyme solution, an active catalyst of the general formula

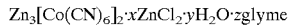

$$Zn_3[Co(CN)_6]_2 \cdot xZnCl_2 \cdot yH_2O \cdot zglyme$$

is obtained (see e.g. EP 700 949).

JP 4 145 123, U.S. Pat. No. 5,470,813, EP 700 949, EP 743 093 and EP 761 708 disclose improved DMC catalysts which, by the use of tert-butanol as the organic complexing ligand (by itself or in combination with a polyether (EP 700 949, EP 761 708)), are capable of further reducing the proportion of monofunctional polyethers with terminal double bonds in the preparation of polyether-polyols. Furthermore, by using the improved DMC catalysts, the induction time for the polyaddition reaction of the alkylene oxides on to corresponding starter compounds is reduced and the catalyst activity is increased.

SUMMARY OF THE INVENTION

The object of the present invention is thus to provide DMC catalysts for the polyaddition of alkylene oxides on to corresponding starter compounds which are improved further and which have an induction time which is reduced considerably with respect to the catalyst types known to date, and at the same time a significantly increased catalyst activity. By shortening the total reaction and cycle times of the polyether-polyol preparation, this leads to an improved profitability of the process. Ideally, because of the increased activity, the catalyst can then be employed in such low concentrations that removal of the catalyst, which is otherwise very expensive, is no longer necessary, and the product can be used directly for polyurethane applications. Surprisingly, it has now been found that DMC catalysts which contain 5–80 wt. %, based on the amount of finished catalyst, of a polyester have significantly shortened induction times and at the same time a greatly increased activity in polyether-polyol preparation.

DETAILED DESCRIPTION OF THE INVENTION

Figure 1:
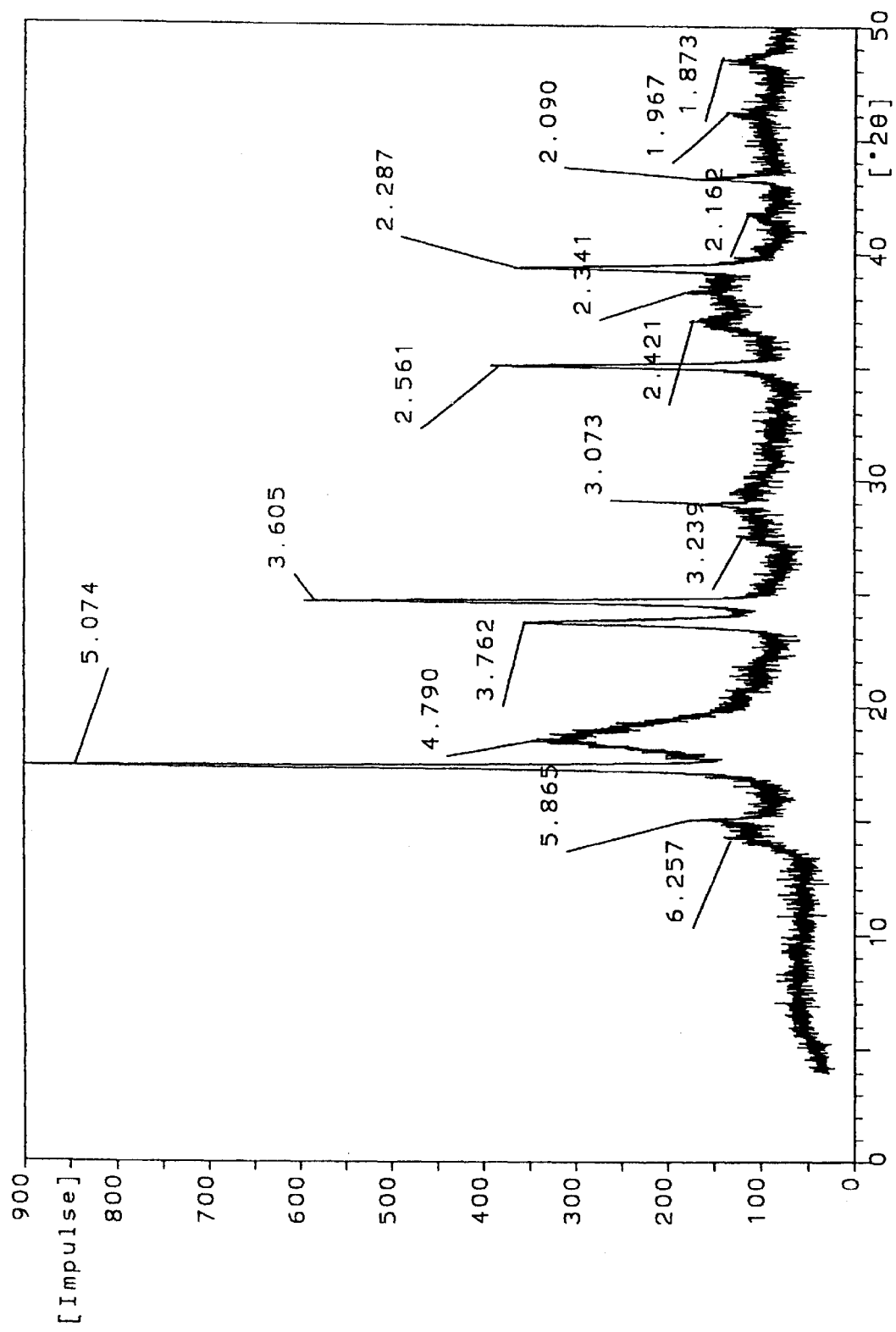
FIG. 1 is a powder X-ray diffraction pattern for the double-metal cyanide catalyst prepared according to Example 2 of the invention.
Figure 2:
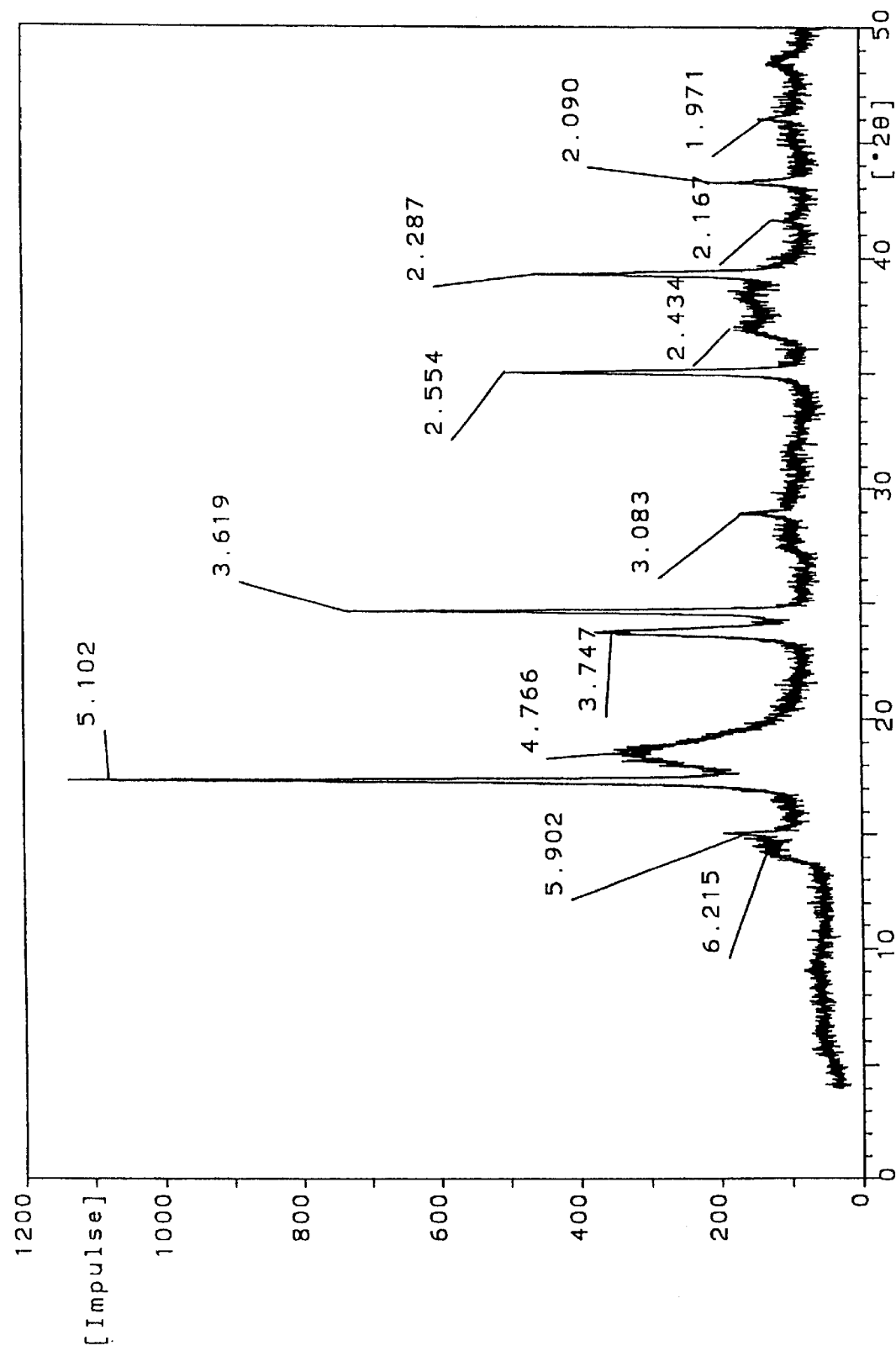
FIG. 2 is a powder X-ray diffraction pattern for the double-metal cyanide catalyst prepared according to Example 3 of the invention.

The present invention provides new improved double-metal cyanide (DMC) catalysts comprising
a) a double-metal cyanide compound and
b) an organic complexing ligand,
which are characterized in that they contain 5 to 80 wt. %, based on the amount of finished catalyst, of a polyester.

The catalysts according to the invention can optionally also comprise water, preferably 1 to 10 wt. %, and/or a water-soluble metal salt, preferably 5 to 25 wt. %, from the preparation of the double-metal cyanide compound.

The double-metal cyanide compounds a) which are suitable for the catalysts according to the invention are the reaction products of a water-soluble metal salt and a water-soluble metal cyanide salt.

The water-soluble metal salt preferably has the general formula $M(X)_n$, wherein M is chosen from the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Zn(II), Fe(II), Co(II) and Ni(II) are particularly preferred. X is an anion, preferably chosen from the group consisting of the halides, hydroxides, sulfates, carbonates, cyanates, thiocyanates, isocyanates, isothiocyanates, carboxylates, oxalates or nitrates. The value of n is 1, 2 or 3.

Examples of suitable metal salts are zinc chloride, zinc bromide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel (II) chloride and nickel(II) nitrate. Mixtures of different metal salts can also be employed.

The water-soluble metal cyanide salt preferably has the general formula $(Y)_a M'(CN)_b (A)_c$, wherein M' is chosen from the metals Fe(II), Fe(III), Co(II), Co(III), Cr(II), Cr(III), Mn(II), Mn(III), Ir(III), Ni(II), Rh(III), Ru(II), V(IV) and V(V). M' is particularly preferably chosen from the metals Co(II), Co(III), Fe(II), Fe(III), Cr(III), Ir(III) and Ni(II). The water-soluble metal cyanide salt can contain one or more of these metals. Y is an alkali metal ion or an alkaline earth metal ion. A is an anion chosen from the group consisting of the halides, hydroxides, sulfates, carbonates, cyanates, thiocyanates, isocyanates, isothiocyanates, carboxylates, oxalates or nitrates. Both a and b are integers ($\geq 1$), the values for a, b and c being chosen such that the electroneutrality of the metal cyanide salt is ensured; c preferably has the value 0. Examples of suitable water-soluble metal cyanide salts are potassium hexacyanocobaltate(III), potassium hexacyanoferrate(II), potassium hexacyanoferrate(III), calcium hexacyanocobaltate(III) and lithium hexacyanocobaltate (III).

Examples of suitable double-metal cyanide compounds a) which can be used in the catalysts according to the invention are zinc hexacyanocobaltate(III), zinc hexacyanoferrate(II), zinc hexacyanoferrate(III), nickel(II) hexacyanoferrate(II) and cobalt(II) hexacyanocobaltate(III). Further examples of suitable double-metal cyanide compounds are to be found e.g. in U.S. Pat. No. 5,158,922 (column 8, lines 29–66). Zinc hexacyanocobaltate(III) is preferably used.

The DMC catalysts according to the invention contain an organic complexing ligand b), since this e.g. increases the catalysis activity. Suitable organic complexing ligands are known in principle and are described in detail in the prior art mentioned above (see e.g. column 6, lines 9–65 in U.S. Pat. No. 5,158,922). The complexing ligand is added either during the preparation of the catalyst or immediately after precipitation of the catalyst. The complexing ligand is usually employed in excess. Preferred complexing ligands are water-soluble organic compounds with heteroatoms which can form complexes with the double-metal cyanide compound. Suitable organic complexing ligands are e.g. alcohols, aldehydes, ketones, ethers, esters, amides, ureas, nitriles, sulfides and mixtures thereof. Preferred organic complexing ligands are water-soluble aliphatic alcohols, such as e.g. ethanol, isopropanol, n-butanol, isobutanol, sec-butanol and tert-butanol. tert-Butanol is particularly preferred.

The DMC catalysts according to the invention contain the double-metal cyanide compounds in amounts of 20 to 85 wt. %, preferably 25 to 80 wt. %, based on the amount of finished catalyst, and the organic complexing ligands in amounts of 1 to 30, preferably 2 to 20 wt. %, again based on the amount of finished catalyst.

The DMC catalysts according to the invention contain 5–80 wt. %, based on the amount of finished catalyst, of a polyester. Preferred catalysts contain 10 to 60 wt. % polyester.

Polyesters which are suitable for the preparation of the catalysts according to the invention are higher molecular weight substances which contain the ester group —O—CO— as a recurring unit in the chain. They are as a rule obtained by polycondensation of polyfunctional carboxylic acids and hydroxy compounds. Further customary preparation possibilities for polyesters comprise polycondensation of hydroxycarboxylic acids, polymerization of cyclic esters (lactones), polyaddition of polycarboxylic acid anhydrides with epoxides and reaction of acid chlorides with alkali metal salts of hydroxy compounds. Transesterification both with hydroxy and with carboxy compounds is also possible.

Methods for the preparation of polyesters are generally well-known and are described in detail, for example, in "Kunststoff Handbuch", volume 7, Polyurethane, 3rd edition, 1993, p. 67–74, "High Polymers", volume 16, Polyurethanes: Chemistry and Technology, I. Chemistry, 1st edition, 1962, p. 44–66, "Ullmanns Encyclopädie der Technischen Chemie", volume 19, 4th edition, 1982, p. 61–88 and "Houben-Weyl, Methoden der organsichen Chemie", volume E20, Makromolekulare Stoffe, 4th edition, 1987, p. 1405–1457.

Polyesters which are preferably employed are linear or partly branched polyesters having average molecular weights below 10,000, which are in general obtained by polycondensation from saturated or unsaturated aliphatic or from cycloaliphatic or from aromatic dicarboxylic acids with difunctional or trifunctional or mixture of di- and trifunctional compounds containing hydroxyl groups, or by ring-opening polymerization of lactones (e.g. caprolactone) with diols and/or triols as starters.

Polyesters having average molecular weights of 400 to 6,000 and OH numbers of 28 to 300 mg KOH/g, which are suitable for the preparation of polyurethanes, are particularly preferably employed. These polyesters are in general prepared by polycondensation of polyfunctional carboxylic acids and hydroxy compounds. Possible polyfunctional hydroxy compounds for this are, in particular: ethylene glycol, diethylene glycol, triethylene glycol, 1,2-propylene glycol, dipropylene glycol, 1,3-butanediol, 1,4-butanediol, 1,6-hexanediol, 1,12-dodecanediol, neopentylglycol, trimethylolpropane, trimethylolethane, glycerol and, in rarer cases, some longer-chain trihydroxy compounds.

Possible polyfunctional carboxylic acids are, in particular: adipic acid, phthalic acid, isophthalic acid, terephthalic acid, oxalic acid, succinic acid, glutaric acid, azelaic acid, sebacic acid, fumaric acid, maleic acid and, in rarer cases, the so-called "dimeric acids", which are obtainable by dimerization of unsaturated plant fatty acids.

Both the use of the organic complexing ligand and that of the polyester are necessary for the preparation of a DMC catalyst with a reduced induction period and increased activity (see examples 7–8 and comparison examples 6 and 9). The catalyst composition is usually analysed by means of elemental analysis and thermogravimetry.

The catalysts according to the invention can be crystalline, substantially crystalline partly crystalline or amorphous. The crystallinity is usually analysed by powder X-ray diffractometry.

Catalyst according to the invention which are preferred are those comprising a) zinc hexacyanocobaltate(III) and b) tert-butanol, which are characterized in that they comprise 5–80 wt. %, based on the amount of finished catalyst, of a polyester with an average molecular weight of 400 to 6,000 and an OH number of 28 to 300 mg KOH/g.

The improved DMC catalysts according to the invention are usually prepared in aqueous solution by reaction of the metal salt (in excess) and metal cyanide salt in the presence of the organic complexing ligand and the polyester.

Preferably, in this preparation, the aqueous solutions of the metal salt (e.g. zinc chloride, employed in a stoichiometric excess (at least 50%, based on the metal cyanide salt)) and of the metal cyanide salt (e.g. potassium hexacyanocobaltate) are first reacted in the presence of the organic complexing ligand (e.g. tert-butanol), a suspension which comprises the double-metal cyanide compound (e.g. zinc hexacyanocobaltate), excess metal salt, water and the organic complexing ligand being formed.

The organic complexing ligand can be present here either in one or in both of the aqueous solutions, or it is added to the suspension immediately after precipitation of the double-metal cyanide compound. It has proved advantageous to mix the aqueous solutions and the organic complexing ligand with vigorous stirring.

The catalyst suspension formed is then treated with the polyester. The polyester is preferably employed in this procedure in a mixture with water and the organic complexing ligand.

The catalyst containing the polyester is isolated from the suspension by known techniques, such as e.g. centrifugation or filtration.

To increase the activity of the catalyst, it is advantageous for the catalyst isolated to be subsequently washed with an aqueous solution of the organic complexing ligand (e.g. by resuspension and subsequent renewed isolation by filtration or centrifugation). It is possible, for example, for water-soluble by-products, such as potassium chloride, which adversely influence the polyaddition reaction to be removed from the catalyst according to the invention in this manner.

The amount of organic complexing ligand in the aqueous washing solution is preferably between 40 and 80 wt. %. It is furthermore advantageous to add a little polyester, preferably in the range between 0.5 and 5 wt. %, to the aqueous washing solution.

It is moreover advantageous to wash the catalyst more than once. The first washing operation e.g. can be repeated for this. However, it is preferable to use non-aqueous solutions, e.g. a mixture of organic complexing ligand and polyester, for further washing operations.

The washed catalyst is finally dried at temperatures of 20–100° C. and under pressure from 0.1 mbar to normal pressure (1013 mbar), optionally after pulverizing.

The invention also provides the use of the improved DMC catalysts according to the invention for the preparation of polyether-polyols by polyaddition of alkylene oxides on to starter compounds containing active hydrogen atoms.

Alkylene oxides which are preferably employed are ethylene oxide, propylene oxide, butylene oxide and mixtures thereof. The polyether chains can be built up by alkoxylation e.g. with only one monomeric epoxide, or also randomly or in blocks with 2 or 3 different monomeric epoxides. Further details can be found in "Ullmanns Encyclopädie der industriellen Chemie", English language edition, 1992, volume A21, pages 670–671.

Compounds having molecular weights of 18 to 2,000 and 1 to 8 hydroxyl groups are employed as the starter compounds containing active hydrogen atoms. Examples which are mentioned are: ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, sucrose, degraded starch and water.

Those starter compounds containing active hydrogen atoms which have been prepared e.g. by conventional alkali catalysis from the abovementioned low molecular weight starters and are oligomeric alkoxylation products having molecular weights of 200 to 2,000 are advantageously employed.

The polyaddition of alkylene oxides on to starter compounds containing active hydrogen which is catalysed by the catalysts according to the invention is in general carried out at temperatures of 20 to 200° C., preferably in the range from 40 to 180° C., particularly preferably at temperatures from 50 to 150° C. The reaction can be carried out under overall pressures of 0 to 20 bar. The polyaddition can be carried out in bulk or an inert organic solvent, such as toluene and/or THF. The amount of solvent is usually 10 to 30 wt. %, based on the amount of polyether-polyol to be prepared.

The catalyst concentration is chosen such that good control of the polyaddition reaction under the given reaction conditions is possible. The catalyst concentration is in general in the range from 0.0005 wt. % to 1 wt. %, preferably in the range from 0.001 wt. % to 0.1 wt. %, based on the amount of polyether-polyol to be prepared.

The molecular weights of the polyether-polyols prepared by the process according to the invention are in the range from 500 to 100,000 g/mol, preferably in the range from 1,000 to 50,000 g/mol, more preferably in the range from 2,000 to 20,000 g/mol.

The polyaddition can be carried out continuously, or in a batch or semibatch process.

The catalysts according to the invention in general require an induction time of some minutes up to several hours.

The induction times in the preparation of polyether-polyols are shortened significantly with the aid of the new catalysts according to the invention, compared with the DMC catalysts known hitherto.

At the same time, the alkoxylation times are greatly reduced because of the substantially increased activity.

This leads to a shortening of the total reaction times (sum of the induction and alkoxylation times) by typically 60–75% compared with the DMC catalysts known hitherto.

Because of their significantly increased activity, the catalysts according to the invention can be employed in such low concentrations (15 ppm and less, based on the amount of polyether-polyol to be prepared, see example 10), that removal of the catalyst from the polyol can generally be omitted for use in polyurethane applications, without the product qualities being adversely influenced.

EXAMPLES

Catalyst Preparation

Comparison Example 1

Preparation of a DMC catalyst with tert-butanol as the organic complexing ligand without using a polyester (catalyst A, synthesis according to JP 4 145 123).

A solution of 10 g (73.3 mmol) zinc chloride in 15 ml distilled water is added to a solution of 4 g (12 mmol) potassium hexacyanocobaltate in 75 ml distilled water with vigorous stirring. Immediately thereafter, a mixture of 50 g tert-butanol and 50 g distilled water is added to the suspension formed and the mixture is then stirred vigorously for 10 min. The solid is isolated by filtration, then stirred with 125 g of a mixture of tert-butanol and distilled water (70/30; w/w) for 10 min and filtered off again. Finally, it is stirred once more with 125 g tert-butanol for 10 min. After filtration the catalyst is dried to constant weight at 50° C. under normal pressure.

Yield of dried pulverulent catalyst: 3.08 g

Elemental analysis: cobalt=13.6%; zinc=27.35%; tert-butanol=14.2%; (polyester=0%).

Example 2

Preparation of a DMC catalyst with tert-butanol as the organic complexing ligand and using a linear polyester (catalyst B).

A solution of 12.5 g (91.5 mmol) zinc chloride in 20 ml distilled water is added to a solution of 4 g (12 mmol) potassium hexacyanocobaltate in 70 ml distilled water with vigorous stirring (24,000 rpm). Immediately thereafter, a mixture of 50 g tert-butanol and 50 g distilled water is added to the suspension formed and the mixture is then stirred vigorously (24,000 rpm) for 10 min. A mixture of 1 g of a linear polyester of adipic acid and ethylene glycol (poly (ethylene adipate)) having an average molecular weight of 2,000 (OH number=55 mg KOH/g), 1 g tert-butanol and 100 g distilled water is then added and the mixture is stirred (1,000 rpm) for 3 min. The solid is isolated by filtration, then stirred (10,000 rpm) with a mixture of 70 g tert-butanol, 30 g distilled water and 1 g of the above polyester and filtered off again. Finally, it is stirred (10,000 rpm) once more with a mixture of 100 g tert-butanol and 0.5 g of the above polyester for 10 min. After filtration, the catalyst is dried to constant weight at 50° C. under normal pressure.

Yield of dried pulverulent catalyst: 4.87 g

Elemental analysis and thermogravimetric analysis: cobalt=10.0%, zinc=20.9%, tert-butanol=7.5%, polyester=22.1%

Example 3

Preparation of a DMC catalyst with tert-butanol as the organic complexing ligand and using a partly branched polyester (catalyst C).

As example 2, but with:

use of a polyester, weakly branched by trimethylolpropane, of adipic acid and diethylene glycol having an average molecular weight of 2,300 (OH number= 50 mg KOH/g) instead of the polyester from example 2.

Yield of dried pulverulent catalyst: 3.85 g

Elemental analysis and thermogravimetric analysis: cobalt=12.2%, zinc=25.7%, tert-butanol=7.1%, polyester=12.3%

Comparison Example 4

Preparation of a DMC catalyst using a polyester without tert-butanol as the organic complexing ligand (catalyst D).

A solution of 12.5 g (91.5 mmol) zinc chloride in 20 ml distilled water is added to a solution of 4 g (12 mmol) potassium hexacyanocobaltate in 70 ml distilled water with vigorous stirring (24,000 rpm). Immediately thereafter, a mixture of 1 g of the polyester from example 2 and 100 g distilled water is added to the suspension formed and the mixture is then stirred vigorously (24,000 rpm) for 10 min. The solid is isolated by filtration, then stirred (10,000 rpm) with a mixture of 1 g polyester and 100 g distilled water for 10 min and filtered off again. Finally, it is stirred (10,000 rpm) once more with a mixture of 0.5 g polyester and 100 g distilled water for 10 min. After filtration, the catalyst is dried to constant weight at 50° C. under normal pressure.

Yield of dried pulverulent catalyst: 5.27 g

Elemental analysis and thermogravimetric analysis: cobalt=9.5%, zinc=16.6%, polyester=25.0% (tert-butanol= 0%)

Comparison Example 5

Preparation of a DMC catalyst with tert-butanol as the organic complexing ligand and using a polyether (catalyst E, synthesis according to EP 700 949).

A solution of 12.5 g (91.5 mmol) zinc chloride in 20 ml distilled water is added to a solution of 4 g (12 mmol) potassium hexacyanocobaltate in 70 ml distilled water with vigorous stirring (24,000 rpm). Immediately thereafter, a mixture of 50 g tert-butanol and 50 g distilled water is added to the suspension formed and the mixture is then stirred vigorously (24,000 rpm) for 10 min. A mixture of 1 g polypropylene glycol having an average molecular weight of 2,000 (OH number=56 mg KOH/g), 1 g tert-butanol and 100 g distilled water is then added and the mixture is stirred (1,000 rpm) for 3 min. The solid is isolated by filtration, then stirred (10,000 rpm) with a mixture of 70 g tert-butanol, 30 g distilled water and 1 g of the above polyether for 10 min and filtered off again. Finally, it is stirred (10,000 rpm) once more with a mixture of 100 g tert-butanol and 0.5 g of the above polyether for 10 min. After filtration, the catalyst is dried to constant weight at 50° C. under normal pressure.

Yield of dried pulverulent catalyst: 6.23 g

Elemental analysis and thermogravimetric analysis: cobalt=11.6%, zinc=24.6%, tert-butanol=3.0%, polyether= 25.8%

Preparation of Polyether-polyols
General Procedure 50 g polypropylene glycol starter (molecular weight=1, 000 g/mol) and 3–20 mg catalyst (15–100 ppm, based on the amount of polyether-polyol to be prepared) are initially introduced into a 500 ml pressure reactor under an inert gas (argon) and are heated up to 105° C., while stirring. Propylene oxide (approx. 5 g) is then metered in all at once, until the overall pressure has risen to 2.5 bar. Further propylene oxide is metered in again only when an accelerated drop in pressure in the reactor is observed. This accelerated drop in pressure indicates that the catalyst is activated. The remaining propylene oxide (145 g) is then metered in continuously under a constant overall pressure of 2.5 bar. When metering of the propylene oxide is complete and after an after-reaction time of 5 hours at 105° C., volatile contents are distilled off at 90° C. (1 mbar) and the product is then cooled to room temperature.

The polyether-polyols obtained were characterized by determination of the OH numbers, the double bond contents and the molecular weight distributions $M_w/M_n$ (MALDI-TOF-MS).

The course of the reaction was monitored with the aid of time/conversion curves (propylene oxide consumption [g] v. reaction time [min]). The induction time was determined from the point of intersection of the tangent at the steepest point of the time/conversion curve with the extended base line of the time/conversion curve.

The propoxylation times, which indicate the catalyst activity, correspond to the period between catalyst activation (end of the induction period) and the end of the propylene oxide metering.

The total reaction time is the sum of the induction and propoxylation time.

Comparison Example 6

| Preparation of polyether-polyol with catalyst A (100 ppm) | | |
|---|---|---|
| Induction time: | | 290 min |
| Propoxylation time: | | 165 min |
| Total reaction time: | | 455 min |
| Polyether-polyol: | OH number (mg KOH/g): | 28.5 |
| | double bond content (mmol/kg): | 6 |
| | $M_w/M_n$: | 1.12 |

Example 7

| Preparation of polyether-polyol with catalyst B (100 ppm) | | |
|---|---|---|
| Induction time: | | 80 min |
| Propoxylation time: | | 55 min |
| Total reaction time: | | 135 min |
| Polyether-polyol: | OH number (mg KOH/g): | 29.7 |
| | double bond content (mmol/kg): | 5 |
| | $M_w/M_n$: | 1.04 |

Example 8

| Preparation of polyether-polyol with catalyst C (100 ppm) | | |
|---|---|---|
| Induction time: | | 70 min |
| Propoxylation time: | | 50 min |
| Total reaction time: | | 120 min |
| Polyether-polyol: | OH number (mg KOH/g): | 29.6 |
| | double bond content (mmol/kg): | 5 |
| | $M_w/M_n$: | 1.04 |

Comparison Example 9

| Preparation of polyether-polyol with catalyst D (100 ppm) | |
|---|---|
| Induction time: | >700 min |
| Propoxylation time: | no activity |

A comparison between examples 7–8 and comparison example 6 illustrated that in the preparation of polyether-polyols with the DMC catalysts according to the invention comprising an organic complexing ligand (tert-butanol) and a polyester, significantly reduced induction times occur compared with a DMC catalyst comprising only an organic complexing ligand (tert-butanol), and that the catalysts according to the invention at the same time have a greatly increased activity (detectable from the substantially shortened propoxylation times).

Comparison example 9 shows that a DMC catalyst which comprises no organic complexing ligand but only a polyester is inactive.

Example 10

| Preparation of polyether-polyol with catalyst C (15 ppm) | | |
|---|---|---|
| Total reaction time | | 335 min |
| Polyether-polyol: | OH number (mg KOH/g): | 27.4 |
| | double bond content (mmol/kg): | 5 |
| | $M_w/M_n$: | 1.05 |

Without removal of the catalyst, the metal content in the polyol: Zn=4 ppm, Co=2 ppm.

Example 10 shows that because of their significantly increased activity, the new DMC catalysts according to the invention can be employed in polyether-polyol preparation in such low concentrations that separation of the catalyst from the polyol can be omitted.

Comparison Example 11

| Preparation of polyether-polyol with catalyst E (15 ppm) | | |
|---|---|---|
| Total reaction time | | 895 min |
| Polyether-polyol: | OH number (mg KOH/g): | 29.8 |
| | double bond content (mmol/kg): | 6 |
| | $M_w/M_n$: | 1.04 |

A comparison between example 10 and comparison example 11 shows that the new DMC catalysts according to the invention comprising an organic complexing ligand (tert-butanol) and a polyester are substantially more active than the highly active DMC catalysts known hitherto, which comprise an organic complexing ligand (tert-butanol) and a polyether (of comparable molecular weight and OH number to the polyesters employed in the catalysts according to the invention). Polyether-polyol preparation with the new catalysts according to the invention is therefore possible in significantly shortened total reaction times.

What is claimed is:

1. Double-metal cyanide (DMC) catalysts comprising:
   a) a double-metal cyanide compound,
   b) an organic complexing ligand, and
   c) 5 to 80 wt. %, based on the amount of finished catalyst, of a polyester, wherein the double-metal cyanide catalyst is substantially crystalline by powder X-ray diffraction analysis.

2. The DMC catalysts according to claim 1, characterized in that the double-metal cyanide compound is zinc hexacyanocobaltate(III).

3. The DMC catalysts according to claim 1, characterized in that the organic complexing ligand is tert-butanol.

4. The DMC catalysts according to claim 1, comprising from 10 to 60 wt. % of said polyester.

5. The DMC catalysts according to claim 1, wherein said polyester comprises one or more linear or partly branched polyesters having average molecular weights below 10,000, which are obtained by (I) reaction of saturated or unsaturated aliphatic, cycloaliphatic or aromatic dicarboxylic acids with difunctional and/or trifunctional compounds containing hydroxyl groups (II) or by ring-opening polymerization of lactones with diols and/or triols.

6. The DMC catalysts according to claim 1, wherein said polyesters having average molecular weights of 400 to 6,000 and OH numbers of 28 to 300 mg KOH/g.

7. A process for the preparation of the DMC catalysts according to claim 1, comprising reacting an excess of one or more metal salts with one or more metal cyanide salts in aqueous solution in the presence of the organic complexing ligand and the polyester, isolating the resultant catalyst, washing the isolated catalyst and drying the washed catalyst.

8. In a process for the production of polyether polyols by polyaddition of alkylene oxides onto starter compounds containing active hydrogen atoms, the improvement wherein said polyaddition of alkylene oxides occurs in the presence of the double-metal cyanide (DMC) catalysts of claim 1.

* * * * *